UNITED STATES PATENT OFFICE.

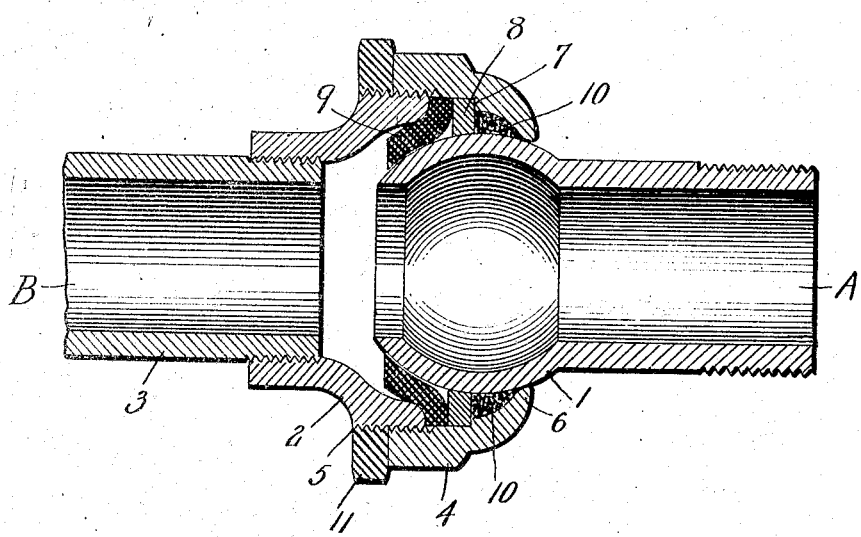

GEORGE E. KELLY AND GEORGE F. ROYER, OF WILKES-BARRE, PENNSYLVANIA, ASSIGNORS TO THE KELLY-ARNOLD MANUFACTURING COMPANY, OF WILKES-BARRE, PENNSYLVANIA, A CORPORATION OF PENNSYLVANIA.

PIPE-COUPLING.

937,533.

Specification of Letters Patent. Patented Oct. 19, 1909.

Application filed October 3, 1906. Serial No. 337,259.

*To all whom it may concern:*

Be it known that we, GEORGE E. KELLY and GEORGE F. ROYER, citizens of the United States, and residents of Wilkes-Barre, Luzerne county, Pennsylvania, have invented certain new and useful Improvements in Pipe-Couplings, of which the following is a specification.

This invention relates to a universal coupling for pipes, and more especially to a joint suitable for connecting steam or air train pipes for heating and braking purposes on railway trains.

The invention will be described in connection with the accompanying drawing illustrating in central section a universal pipe joint embodying the invention.

Referring to the drawing, A indicates the ball member, and B the socket member. The ball member A is tubular and provided with a head having a spherical outer surface 1. The socket member B comprises a flaring or bell portion 2, which may, if desired, be integral with the tubular portion 3, but as shown these parts are connected by a screw joint. A coupling ring 4 unites the bell 2 with the ball 1. The ring 4 has an adjustable threaded connection 5 with the bell 2 at one end, and its opposite end has an inwardly turned flange 6, the diameter of which is somewhat less than the diameter of the spherical head or ball 1.

On the inner surface of the ring 4 is a shoulder 7, which surface has an abutment for a packing ring 8. The inner edge of the ring 8 conforms to the ball 1, but is of slightly less diameter and is thus adapted to take the thrust of the ball when the members A, B, are pushed toward each other. The packing ring 8 is preferably of metal or other strong hard material.

Between the rigid packing ring 8 and the bell 2 is a flexible packing ring 9, the outer edge of which is clamped between the bell and the rigid packing ring; while the inner edge extends under the bell and lies close to the spherical surface 1. The annular space between the rigid packing ring 8 and the flange 6 is filled with a suitable lubricating packing 10, which may contain oil or graphite or both for a lubricant.

In assembling the parts the coupling ring 4 is first slipped over the coupling member A, after which the packing material 10, the rigid ring 8, and the flexible ring 9 are successively placed in position. The bell 2 is then screwed into the ring 4 until the parts are securely clamped. It will be understood that sufficient packing material 10 is employed so that in assembling the parts it will be rather densely packed between the ring 8 and the flange 6. When the several parts are properly clamped in position, the coupling ring 4 is secured from turning by a lock nut 11.

In operation the rigid ring 8, which is of less diameter than the spherical head 1, is adapted to take any inward thrust of the section A. Outward thrust of the section A is sustained by the flange 6 and the interposed packing 10, which packing lubricates the joint. The flexible packing ring 9 fits closely to the ball joint and its outer surface is exposed to the pressure within the tube, which pressure tends to press the packing against the ball and effectually prevent leakage. The rigid packing ring 8 and the lubricating packing 10 also assist in preventing leakage, so that the joint is prevented in several ways from leaking, and it is especially secure in this respect. It is also simple and cheap in construction and very effective for the purposes for which it is intended.

Having thus described our invention, what is claimed and desired to be secured by Letters Patent is,—

1. In a flexible pipe coupling, the combination with a socket member, and a ball member, of a coupling ring detachably connected with the socket member and bearing on the ball member, a rigid packing ring bearing against a shoulder on the inner surface of the coupling ring and adapted to receive the thrust of the ball member in the direction of the socket member, and a flexible packing ring secured between said rigid ring and the adjacent end of the socket member.

2. In a flexible pipe coupling, the combination with the ball member and the socket member, of a rigid packing ring arranged in but formed separate from the socket member and adapted to bear upon the ball to receive the inward thrust thereof, a flexible packing ring secured on the inner side of said rigid packing ring, and lubricating packing secured upon the outer side of said rigid ring.

In testimony whereof we affix our signatures in presence of two witnesses.

GEORGE E. KELLY.
GEORGE F. ROYER.

Witnesses:
JOHN J. O'DONNELL,
EDWARD N. NOLL.